I. A. RICE.
COTTON CHOPPER.
APPLICATION FILED APR. 29, 1914.
1,125,714.
Patented Jan. 19, 1915.
2 SHEETS—SHEET 1.
Fig. 1.
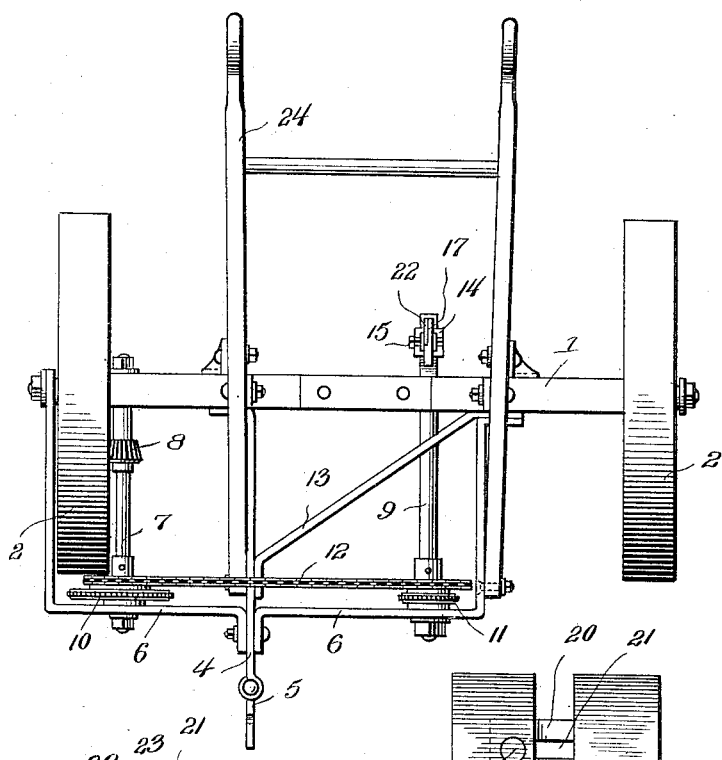
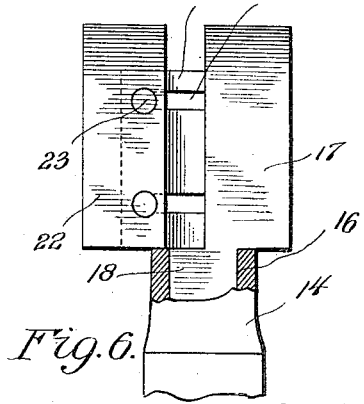
Fig. 5.   Fig. 6.
Witnesses
W. P. Smith
K. Peacock
Inventor
I. A. Rice.
By Victor J. Evans
Attorney I. A. RICE.
COTTON CHOPPER.
APPLICATION FILED APR. 29, 1914.
1,125,714.
Patented Jan. 19, 1915.
2 SHEETS—SHEET 2.
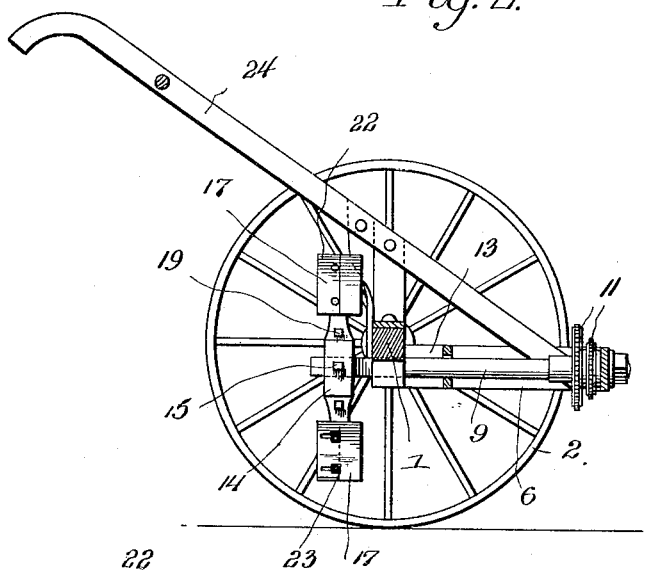
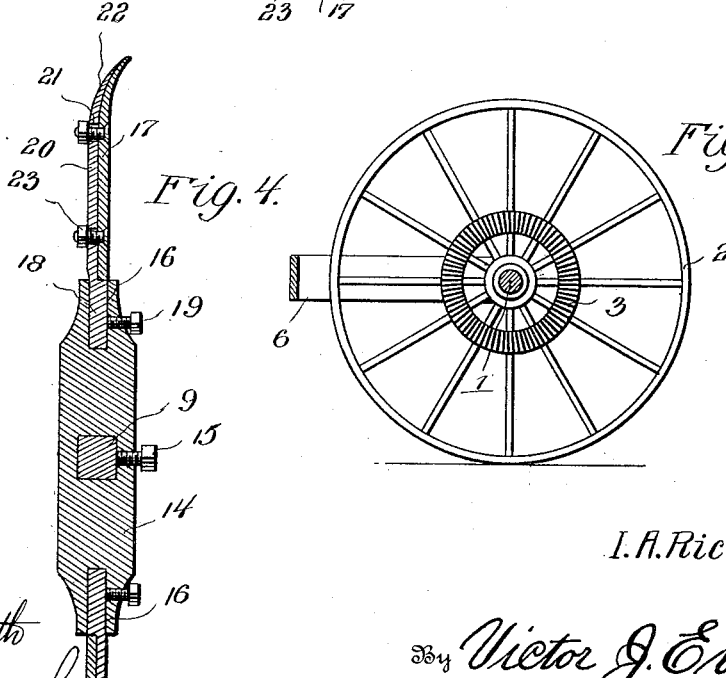
Witnesses
W. R. Smith
N. Peacock
Inventor
I. A. Rice.
By Victor J. Evans
Attorney

UNITED STATES PATENT OFFICE.

IRVAN ALFORD RICE, OF DALARK, ARKANSAS.

COTTON-CHOPPER.

1,125,714. Specification of Letters Patent. Patented Jan. 19, 1915.

Application filed April 29, 1914. Serial No. 835,181.

*To all whom it may concern:*

Be it known that I, IRVAN A. RICE, a citizen of the United States, residing at Dalark, in the county of Dallas and State of Arkansas, have invented new and useful Improvements in Cotton-Choppers, of which the following is a specification.

This invention relates to cotton choppers and it consists in the novel features hereinafter described and claimed.

An object of the invention is to provide a cotton chopper of simple structure which may be easily and readily operated to cut out the superfluous plants of a line of plants in a row in order that those which are left remaining in the row may be supplied with sufficient sustenance from the soil to enable them to properly develop and produce the desired crop.

With the above object in view the chopper comprises a wheel mounted axle with a shaft journaled for rotation and positioned transversely with relation to the axle. The said shaft carries chopping blades which are adapted to cut out the undesired plants and means is provided for rotating the said shaft from one of the supporting wheels of the axle.

In the accompanying drawing:—Figure 1 is a top plan view of the cotton chopper. Fig. 2 is a longitudinal sectional view of the same. Fig. 3 is a detailed vertical view of part of the same. Fig. 4 is a detailed sectional view of one of the chopping blades and attached parts. Fig. 5 is a transverse sectional view of one of the blades. Fig. 6 is an elevation of one of the blades with parts in section.

The cotton chopper comprises an axle 1 having journaled at the ends thereof ground wheels 2. One of the said wheels is provided at its side with a gear wheel 3. A draft bar 4 is connected at its rear end with the intermediate portion of the axle 1 and a clevis hook 5 is pivotally connected with the forward end of the said draft bar. Brackets 6 are connected at their rear ends with the axle 1 and the forward ends of the said brackets are connected with the draft bar 4 at a point behind the point of pivotal connection between the said draft bar and hook 5. A stub shaft 7 is journaled at its rear end in a bearing provided upon the axle 1 and the forward end of the said stub shaft is journaled in one of the brackets 6. The said stub shaft carries at a point between its ends a beveled pinion 8 which meshes with the teeth mounted upon one of the ground wheels 2. A shaft 9 is journaled at one end in a bearing provided upon the axle 1 and the other end portion of the shaft 9 is journaled in the other bracket 6. Large and small sprocket wheels 10 are fixed to the stub shaft 7 and large and small sprocket wheels 11 are fixed to the shaft 9. A sprocket chain 12 is trained around one of the sprocket wheels 10 and one of the sprocket wheels 11 and is adapted to transmit rotary movement from the stub shaft 7 to the shaft 9. The relative rates at which the said shafts may rotate may be regulated by placing the chain 12 around the large or small sprocket wheels of the sets of sprocket wheels 10 and 11. A brace 13 is connected with its forward end to the forward portion of the draft bar 14 and at its rear end the said brace 13 is connected with the axle 1 at a point in the vicinity of the bearing in which the shaft 9 is journaled. A head 14 is secured by means of a set screw 15 at a desired point upon the shaft 9 and the said head 14 is provided at its opposite end with sockets 16. Blades 17 are provided with shanks 18 which are adapted to be inserted in the sockets 16 and when so inserted may be secured by means of set screws 19 which pass transversely through the side portions of the head 14. Each blade 17 is provided at its rear edge with an offset plate 20 having slots 21 and supplemental blades 22 are positioned upon the plates 20 and are provided with bolts 23 which are adapted to pass through the slots 21 and afford means whereby the said blades 22 may be adjustably secured with relation to the blades 17. Handles 24 are secured at their forward ends to one of the brackets 6 and the draft 4 respectively and the intermediate portions of the said handles are supported by braces the lower ends of which are connected with the axle 1.

From the above description taken in connection with the accompanying drawing it will be seen that as the chopper is drawn over the surface of the ground the ground wheels 2 will be rotated and too the stub shaft 7 which is rotated by means of the intermeshing gear wheels carried by the same and the gear teeth of the adjacent ground wheel 2 and the chain 12 the shaft 9 is rotated whereby the blades 17 and the blades 22 are rotated about the axis of the shaft 9. The said blades during their rotating movement as above indicated will chop out the undesired or superfluous plants in a row of plants and consequently as the machine is moved along the said row of plants the line of plants is thinned or chopped out.

If at any time it should be desired that the blades hereinbefore described should escape or miss the plants the rear ends of the handles 24 may be raised to such an extent as to move the said blades above the plants and consequently all of the plants will be left standing in the row as the machine is drawn along the same.

Having described the invention what is claimed is:—

In a cotton chopper a blade provided at its side edge with an offset plate having slots disposed transversely thereof, and a supplemental blade resting upon said plate and having bolts passing through the slots, the last mentioned blade being adjustable with relation to the first mentioned blade, said blades having their forward surfaces lying in the same plane.

In testimony whereof I affix my signature in presence of two witnesses.

IRVAN ALFORD RICE.

Witnesses:
W. F. RUSSELL,
E. E. ELDER.

Copies of this patent may be obtained for five cents each, by addressing the "Commissioner of Patents, Washington, D. C."